United States Patent
Park et al.

(10) Patent No.: US 10,172,019 B2
(45) Date of Patent: Jan. 1, 2019

(54) METHOD AND DEVICE FOR TRANSMITTING DATA IN WIRELESS LAN

(71) Applicant: LG ELECTRONICS INC., Seoul (KR)

(72) Inventors: Giwon Park, Seoul (KR); Kiseon Ryu, Seoul (KR); Jeongki Kim, Seoul (KR); Hangyu Cho, Seoul (KR); Suhwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 304 days.

(21) Appl. No.: 14/913,955

(22) PCT Filed: Sep. 5, 2014

(86) PCT No.: PCT/KR2014/008358
§ 371 (c)(1),
(2) Date: Feb. 23, 2016

(87) PCT Pub. No.: WO2015/037879
PCT Pub. Date: Mar. 19, 2015

(65) Prior Publication Data
US 2016/0219441 A1   Jul. 28, 2016

Related U.S. Application Data

(60) Provisional application No. 61/876,736, filed on Sep. 11, 2013.

(51) Int. Cl.
*H04W 24/02* (2009.01)
*H04W 74/08* (2009.01)
(Continued)

(52) U.S. Cl.
CPC ......... *H04W 24/02* (2013.01); *H04W 52/367* (2013.01); *H04W 52/38* (2013.01);
(Continued)

(58) Field of Classification Search
CPC ... H04W 24/02; H04W 52/367; H04W 52/38; H04W 52/50; H04W 74/0816
See application file for complete search history.

(56) References Cited

U.S. PATENT DOCUMENTS

2007/0147322 A1\* 6/2007 Agrawal ............ H04W 52/325
370/338
2009/0238095 A1   9/2009 Blackwell et al.
(Continued)

FOREIGN PATENT DOCUMENTS

KR   1020130079624   7/2013
WO   2007081683      7/2007

OTHER PUBLICATIONS

PCT International Application No. PCT/US2007/000027, International Search Report, 2 pages.
(Continued)

*Primary Examiner* — Derrick Ferris
*Assistant Examiner* — Kevin Lee
(74) *Attorney, Agent, or Firm* — Lee Hong Degerman Kang & Waimey

(57) ABSTRACT

A method for transmitting data in a wireless LAN may comprise the steps of: receiving a non-target clear to send (CTS) frame from a second station (STA) by a first STA; transmitting a request to send (RTS) frame to a first access point (AP) coupled with the first STA within a network allocation vector (NAV) interval configured on the basis of the non-target CTS frame by the first STA; receiving a CTS frame in response to the RTS frame from the first AP by the first STA; and transmitting a first data frame to the first AP by the first STA.

4 Claims, 17 Drawing Sheets

(51) Int. Cl.
  *H04W 52/38* (2009.01)
  *H04W 52/36* (2009.01)
  *H04W 52/50* (2009.01)
  *H04W 84/12* (2009.01)
(52) U.S. Cl.
  CPC ....... *H04W 52/50* (2013.01); *H04W 74/0816* (2013.01); *H04W 84/12* (2013.01)

(56) References Cited

U.S. PATENT DOCUMENTS

| | | | |
|---|---|---|---|
| 2010/0080173 A1* | 4/2010 | Takagi | H04L 27/0006 370/328 |
| 2011/0194542 A1* | 8/2011 | Kim | H04W 74/0816 370/338 |
| 2011/0317630 A1 | 12/2011 | Zhu et al. | |
| 2012/0063406 A1 | 3/2012 | Seok | |
| 2015/0139116 A1* | 5/2015 | Wang | H04B 7/0408 370/329 |
| 2016/0165549 A1* | 6/2016 | Zhang | H04W 52/243 370/329 |

OTHER PUBLICATIONS

Vella, "A Survey of Multicasting over Wireless Access Networks", IEEE Communications Surveys & Tutorials, vol. 15, No. 2, Second Quarter 2013, 37 pages.

* cited by examiner

FIG. 1
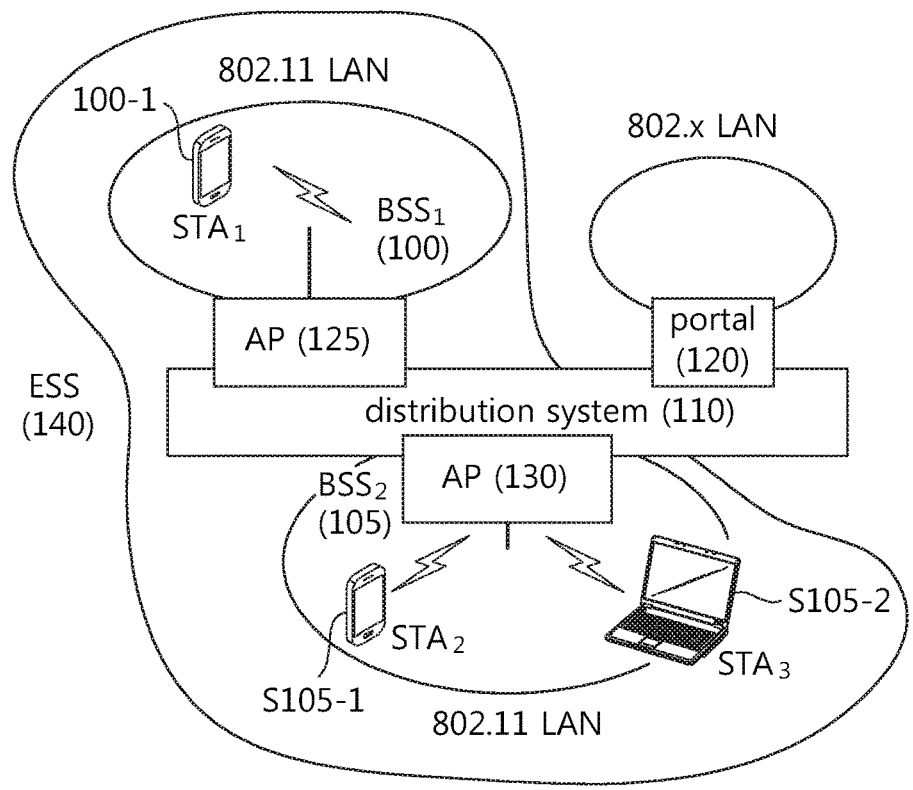
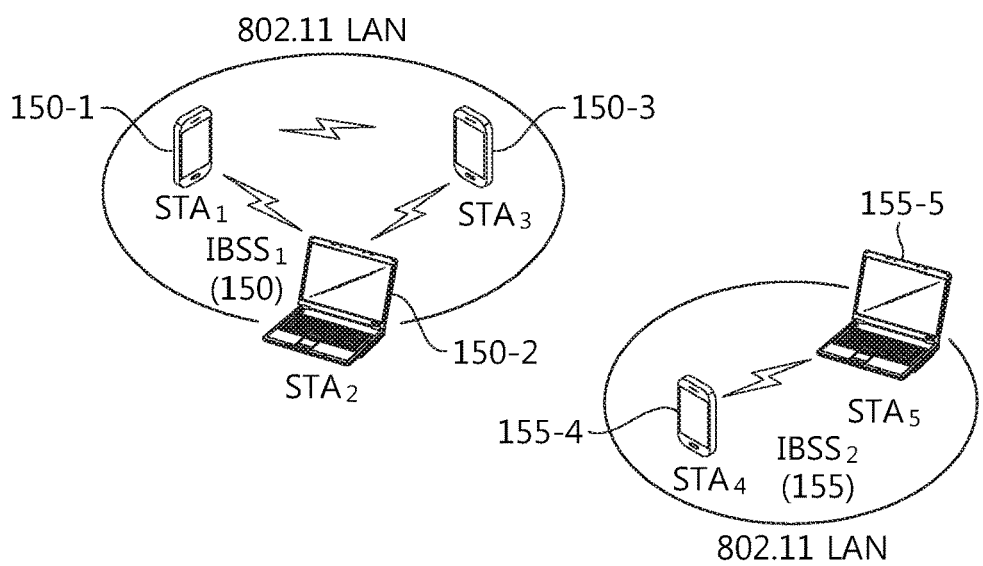

FIG. 3
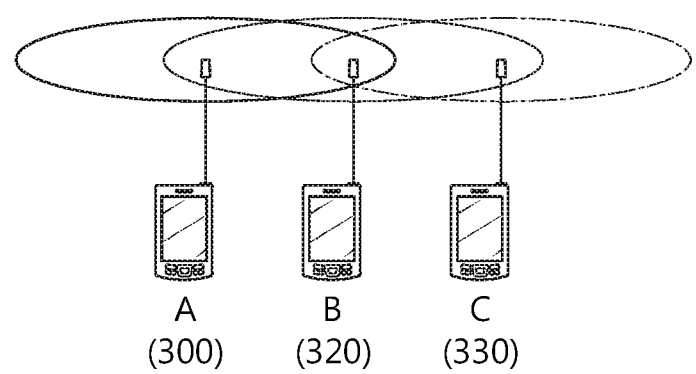
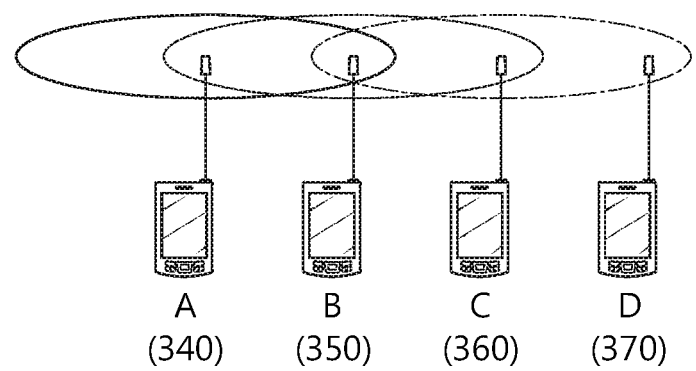

FIG. 4
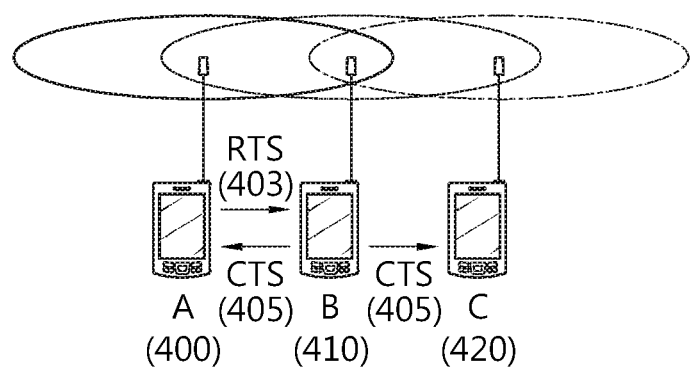
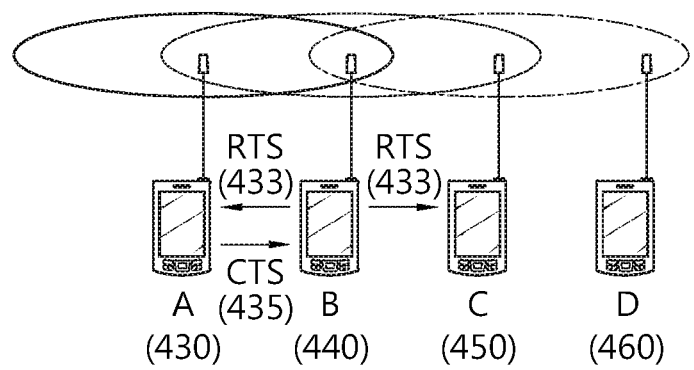

METHOD AND DEVICE FOR TRANSMITTING DATA IN WIRELESS LAN

CROSS-REFERENCE TO RELATED APPLICATIONS

This application is the National Stage filing under 35 U.S.C. 371 of International Application No. PCT/KR2014/008358, filed on Sep. 5, 2014, which claims the benefit of U.S. Provisional Application No. 61/876,736, filed on Sep. 11, 2013, the contents of which are all hereby incorporated by reference herein in their entirety.

TECHNICAL FIELD

The present invention relates to wireless communications, and more particularly, to a method and apparatus for transmitting data in a wireless local area network (WLAN).

BACKGROUND ART

A Wireless Next Generation Standing Committee (WNG SC) of institute of electrical and electronic engineers (IEEE) 802.11 is an AD-HOC committee that a next-generation wireless local area network (WLAN) in the medium and long term.

In an IEEE conference in March 2013, Broadcom presented the need of discussion of the next-generation WLAN after IEEE 802.11ac in the first half of 2013 when an IEEE 802.11ac standard is finished based on a WLAN standardization history. A motion for foundation of a study group which Orange and Broadcom proposed in the IEEE conference in March 2013 and most members agreed has been passed.

A scope of IEEE 802.11ax (or a high efficiency WLAN (HEW)) which the next-generation WLAN study group primarily discusses the next-generation study group called the HEW includes 1) improving a 802.11 physical (PHY) layer and a medium access control (MAC) layer in bands of 2.4 GHz and 5 GHz, 2) increasing spectrum efficiency and area throughput, 3) improving performance in actual indoor and outdoor environments such as an environment in which an interference source exists, a dense heterogeneous network environment, and an environment in which a high user load exists, and the like. That is, the IEEE 802.11ax operates at 2.4 GHz and 5 GHz similarly to the existing WLAN system. A primarily considered scenario is a dense environment in which access points (APs) and stations (STAs) are a lot and under such a situation, improvement of the spectrum efficiency and the area throughput is discussed. In particular, in addition to the indoor environment, in the outdoor environment which is not considerably considered in the existing WLAN, substantial performance improvement is concerned.

In the IEEE 802.11ax, scenarios such as wireless office, smart home, stadium, Hotspot, and building/apartment are largely concerned and discussion about improvement of system performance in the dense environment in which the APs and the STAs are a lot is performed based on the corresponding scenarios.

In the future, in the IEEE 802.11ax, improvement of system performance in an overlapping basic service set (OBSS) environment and improvement of outdoor environment performance, and cellular offloading are anticipated to be actively discussed rather than improvement of single link performance in one basic service set (BSS). Directionality of the HEV means that the next-generation WLAN gradually has a technical scope similar to mobile communication. When a situation is considered, in which the mobile communication and the WLAN technology haven been discussed in a small cell and a direct-to-direct (D2D) communication area in recent years, technical and business convergence of the next-generation WLAN and the mobile communication based on the HEW is predicted to be further active.

DISCLOSURE

Technical Problem

An aspect of the present invention is to provide a method for transmitting data in a wireless local area network (WLAN).

Another aspect of the present invention is to provide an apparatus for transmitting data in a WLAN.

Technical Solution

To achieve the foregoing purpose, a method for transmitting data in a wireless local area network (WLAN) according to one aspect of the present invention includes receiving, by a first station (STA), a non-target Clear to Send (CTS) frame from a second STA, transmitting, by the first STA, a Request to Send (RTS) frame to a first access point (AP) connected to the first STA within a network allocation vector (NAV) period set on the basis of the non-target CTS frame, receiving, by the first STA, a CTS frame from the first AP in response to the RTS frame, and transmitting, by the first STA, a first data frame to the first AP, wherein a Receiver Address (RA) field of the non-target CTS frame includes identification information on a third STA, the RTS frame is transmitted based on first adjusted transmit power obtained by adjusting available full transmit power, and the first data frame is transmitted based on second adjusted transmit power obtained by adjusting the available full transmit power.

To achieve the foregoing purpose, a first STA transmitting data in a WLAN according to another aspect of the present invention includes a radio frequency (RF) unit configured to transmit or receive a radio signal, and a processor operatively connected to the RF unit, wherein the processor receives a non-target CTS frame from a second STA, transmits an TS frame to a first AP connected to the first STA within an AV period set on the basis of the non-target CTS frame, receives a CTS frame from the first AP in response to the RTS frame, and transmits a first data frame to the first AP, an RA field of the non-target CTS frame includes identification information on a third STA, the RTS frame is transmitted based on first adjusted transmit power obtained by adjusting available full transmit power, and the first data frame is transmitted based on second adjusted transmit power obtained by adjusting the available full transmit power.

Advantageous Effects

Data is transmitted without unnecessarily setting a network allocation vector (NAV), thereby improving radio resource use efficiency in a wireless local area network (WLAN).

DESCRIPTION OF DRAWINGS

FIG. 1 is a concept view illustrating the structure of a wireless local area network (WLAN).

FIG. 3 is a concept view illustrating an issue which may occur when a station (SAT) senses a medium.

FIG. 4 is a concept view illustrating a method of transmitting and receiving an Request to Send (RTS) frame and a Clear to Send (CTS) frame in order to solve a hidden node issue and an exposed node issue.

MODE FOR INVENTION

FIG. 1 is a concept view illustrating the structure of a wireless local area network (WLAN).

An upper part of FIG. 1 shows the structure of the IEEE (institute of electrical and electronic engineers) 802.11 infrastructure network.

Referring to the upper part of FIG. 1, the WLAN system may include one or more basic service sets (BSSs, 100 and 105). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to the AP 130.

The infrastructure BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected via the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in the upper part of FIG. 1, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

A lower part of FIG. 1 is a concept view illustrating an independent BSS.

Referring to the lower part of FIG. 1, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may, in its definition, include both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Figure 2:
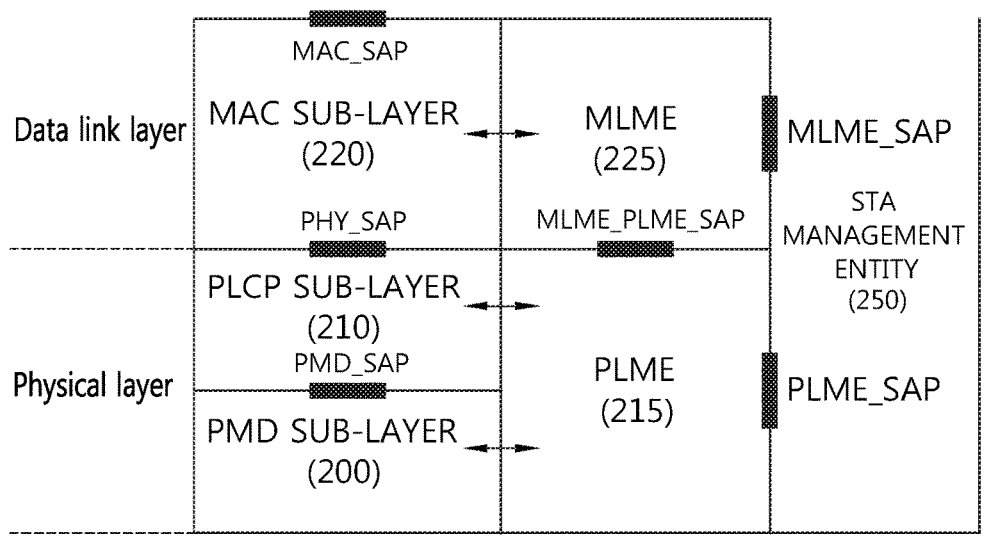
FIG. 2 is a view illustrating a layer architecture of a WLAN system supported by IEEE 802.11.

FIG. 2 is a view illustrating a layer architecture of a WLAN system supported by IEEE 802.11.

FIG. 2 conceptually illustrates a layer architecture (PHY architecture) of a WLAN system.

The WLAN system layer architecture may include an MAC (medium access control) sub-layer 220, a PLCP (Physical Layer Convergence Procedure) sub-layer 210, and a PMD (Physical Medium Dependent) sub-layer 200. The PLCP sub-layer 210 is implemented so that the MAC sub-layer 220 is operated with the minimum dependency upon the PMD sub-layer 200. The PMD sub-layer 200 may serve as a transmission interface to communicate data between a plurality of STAs.

The MAC sub-layer 220, the PLCP sub-layer 210, and the PMD sub-layer 200 may conceptually include management entities.

The management entity of the MAC sub-layer 220 is denoted an MLME (MAC layer management entity, 225), and the management entity of the physical layer is denoted a PLME (PHY layer management entity, 215). Such management entities may offer an interface where a layer management operation is conducted. The PLME 215 is connected with the MLME 225 to be able to perform a management operation on the PLCP sub-layer 210 and the PMD sub-layer 200, and the MLME 225 is also connected with the PLME 215 to be able to perform a management operation on the MAC sub-layer 220.

There may be an SME (STA management entity, 250) to perform a proper MAC layer operation. The SME 250 may be operated as a layer independent component. The MLME, PLME, and SME may communicate information between the mutual components based on primitive.

The operation of each sub-layer is briefly described below. The PLCP sub-layer 210 delivers an MPDU (MAC protocol data unit) received from the MAC sub-layer 220 according to an instruction from the MAC layer between the MAC sub-layer 220 and the PMD sub-layer 200 to the PMD sub-layer 200 or delivers a frame from the PMD sub-layer 200 to the MAC sub-layer 220. The PMD sub-layer 200 is a PLCP sub-layer and the PMD sub-layer 200 may communicate data between a plurality of STAs by way of a radio medium. The MPDU (MAC protocol data unit) delivered from the MAC sub-layer 220 is denoted a PSDU (Physical Service Data Unit) on the side of the PLCP sub-layer 210. The MPDU is similar to the PSDU, but in case an A-MPDU (aggregated MPDU), which is obtained by aggregating a plurality of MPDUs, has been delivered, each MPDUs may differ from the PSDU.

The PLCP sub-layer 210 adds an additional field including information required by the physical layer transceiver while receiving the PSDU from the MAC sub-layer 220 and delivering the same to the PMD sub-layer 200. In this case, the added field may include a PLCP preamble to the PSDU, a PLCP header, and tail bits necessary to return the convolution encoder to zero state. The PLCP preamble may play a role to allow the receiver to prepare for syncing and antenna diversity before the PSDU is transmitted. The data field may include padding bits to the PSDU, a service field including a bit sequence to initialize the scrambler, and a coded sequence in which a bit sequence added with tail bits has been encoded. In this case, as the encoding scheme, one of BCC (Binary Convolutional Coding) encoding or LDPC (Low Density Parity Check) encoding may be selected depending on the encoding scheme supported by the STA receiving the PPDU. The PLCP header may include a field containing information on the PPDU (PLCP Protocol Data Unit) to be transmitted. The PLCP sub-layer 210 adds the above-described fields to the PSDU to generate the PPDU (PLCP Protocol Data Unit) and transmits the same to a receiving station via the PMD sub-layer 200, and the receiving station receives the PPDU and obtains information necessary for data restoration from the PLCP preamble and PLCP header to thus restore the same.

FIG. 3 is a concept view illustrating an issue which may occur when an SAT senses a medium.

An upper part of FIG. 3 illustrates a hidden node issue, and FIG. 1(B) illustrates an exposed node issue.

In the upper part of FIG. 3, it is assumed that STA A 300 and STA B 320 are currently transmitting and receiving data and STA C 330 has data to transmit to STA B 320. When data is transmitted and received between STA A 300 and STA B 320, a particular channel may be occupied. However, when STA C 330 performs carrier sensing with respect to a medium before sending the data to STA B 320, STA C 330 may possibly determine due to transmission coverage that the medium for transmitting the data to STA B 320 is idle. When STA C 330 determines that the medium is idle, the data may be transmitted from STA C 330 to STA B 320. In the end, since STA B 320 receives information from STA A 300 and information from STA C 330 simultaneously, a data collision occurs. Here, for STA C 330, STA A 300 is a hidden node.

In a lower part of FIG. 3, it is assumed that STA B 350 transmits data to STA A 340. When STA C 360 intends to transmit data to STA D 370, STA C 360 may perform carrier sensing in order to identify whether a channel is occupied. Since STA B 350 is transmitting information to STA A 340, STA C 360 may sense the medium to be occupied (busy) due to transmission coverage of STA B 350. In this case, since the medium is sensed to be busy, STA C 360 cannot transmit data to STA D 370 although desiring to transmit data to STA D 370. STA C 360 needs to unnecessarily wait until STA B 350 finishes transmitting data to STA A 340 so that the medium is sensed to be idle. That is, although STA A 340 is out of a carrier sensing range of STA C 360, STA A 340 may prevent STA C 360 from transmitting data. Here, STA C 360 is an expose node of STA B 350.

In order to solve the hidden node issue illustrated in the upper part of FIG. 3 and the exposed node issue illustrated in the lower part of FIG. 3, it may be sensed using a Request to Send (RTS) frame and a Clear to Send (CTS) frame whether a medium is occupied in a WLAN.

FIG. 4 is a concept view illustrating a method of transmitting and receiving an RTS frame and a CTS frame in order to solve the hidden node issue and the exposed node issue.

Referring to FIG. 4, a short signaling frame, such as an RTS frame and a CTS frame, may be used to solve the hidden node issue and the exposed node issue. It may be overheard based on the RTS frame and the CTS frame whether data transmission and reception is performed between neighboring STAs.

An upper part of FIG. 4 illustrates a method of transmitting an RTS frame 403 and a CTS frame 405 in order to solve the hidden node issue.

Assuming that both STA A 400 and STA C 420 intend to transmit data, when STA A 400 transmits an RTS frame 403 to STA B 410, STA B 410 may transmit a CTS frame 405 to both STA A 400 and STA C 420 which are adjacent to STA B 410. STA C 420 receiving the CTS frame 405 from STA B 410 may acquire information that STA A 400 and STA B 410 are transmitting data. Further, the RTS frame 403 and the CTS frame 405 include a duration field including information on a period in which a radio channel is occupied, thus setting a network allocation vector (NAV) for a certain period of time so that STA C 420 does not use the channel.

STA C 420 waits until transmission and reception of data is finished between STA A 400 and STA B 410, thereby avoiding a collision when transmitting data to STA B 410.

A lower part of FIG. 4 illustrates a method of transmitting an RTS frame 433 and a CTS frame 435 in order to solve the exposed node issue.

STA C 450 overhears transmissions of the RTS frame 433 and the CTS frame 435 by STA A 430 and STA B 440, thereby recognizing that no collision occurs when STA C 450 transmits data to STA D 460. That is, STA B 440 transmits the RTS frame 433 to all neighboring STAs and only STA A 430 having data to actually send transmits the CTS frame 435. Since STA C 450 receives the RTS frame 433 only and does not receive the CTS frame 435 from STA A 430, STA A 430 is identified as being out of a carrier sensing range of STA C 450. Thus, STA C 450 may transmit data to STA D 460.

An RTS frame format and a CTS frame format are disclosed in IEEE Draft P802.11-REVmb™/D12 published in November, 2011, "IEEE Standard for Information Technology-Telecommunications and Information Exchange between Systems-Local and Metropolitan Area Networks-Specific Requirements Part 11: Wireless LAN Medium Access Control (MAC) and Physical Layer (PHY) Specifications, 8.3.1.2 RTS Frame Format and 8.3.1.3 CTS Frame Format."

Figure 5:
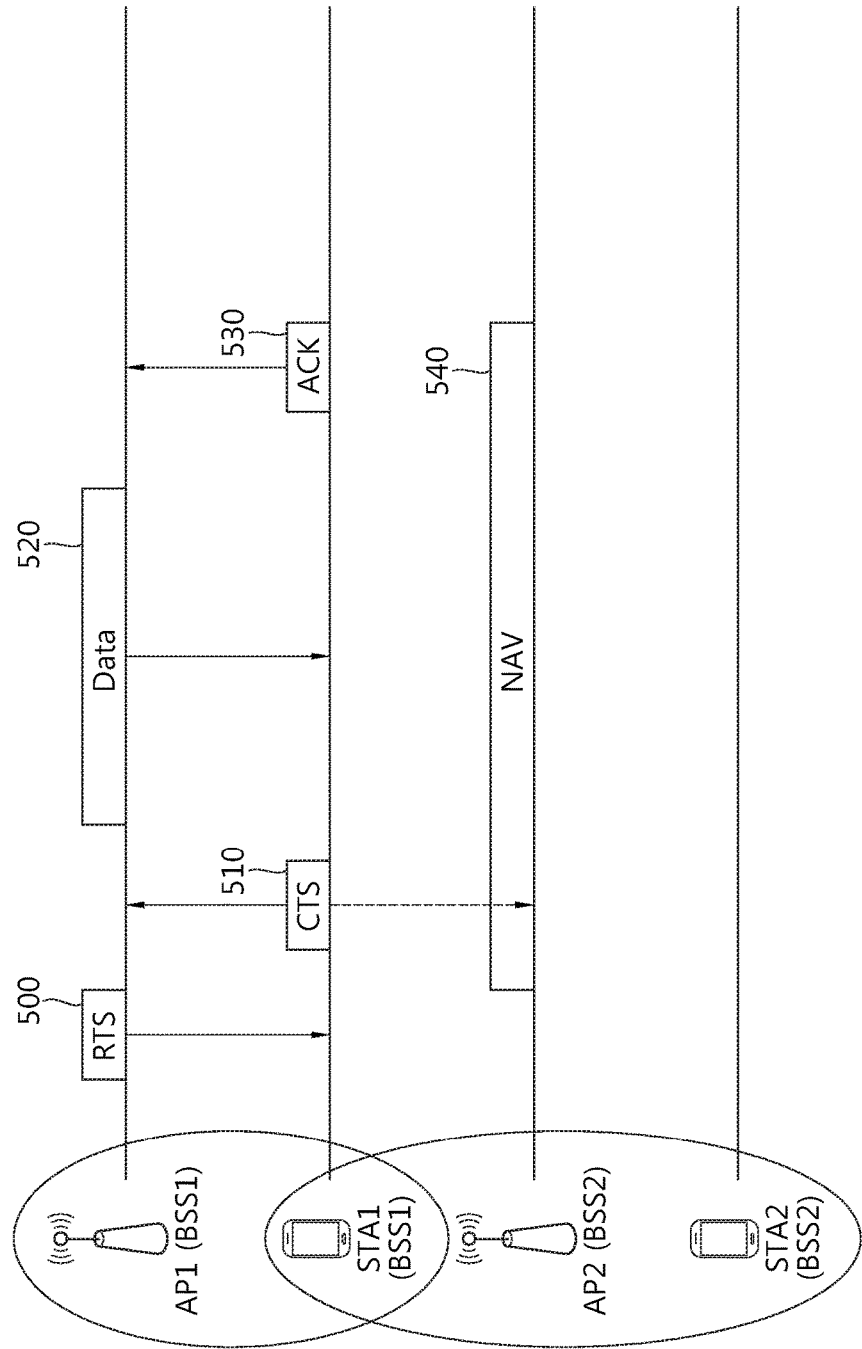
FIG. 5 is a concept view illustrating performance degradation possibility of a WLAN in conventional transmission of an RTS frame/CTS frame.

FIG. 5 is a concept view illustrating performance degradation possibility of a WLAN in conventional transmission of an RTS frame/CTS frame.

FIG. 5 illustrates that unnecessary use of resources occurring by an NAV set for a neighboring STA due to an RTS frame and/or CTS frame is restricted when the RTS frame 500 and CTS frame are transmitted and received and a data frame is transmitted in a conventional WLAN.

In FIG. 5, it is assumed that STA1 and AP1 are connected and STA2 and AP2 are connected. Further, STA1 is assumed to be in coverage of AP1 and coverage of AP2.

AP1 may perform clear channel assessment (CCA)-based channel sensing in order to transmit a frame to STA1. When a channel is idle, AP1 may transmit an RTS frame 500 to STA1. STA1 receiving the RTS frame 500 transmits a CTS frame 510 to AP1, and AP1 receiving the CTS frame 510 may transmit a data frame 520 to STA1. When AP1 finishes transmitting the data frame 520, STA1 transmits an acknowledgement (ACK) 530 to AP1.

AP2 may hear the CTS frame 510 transmitted by STA1 and set an NAV. In an NAV period, transmission of data by AP2 is restricted. Although AP2 is allowed to use a portion of the NAV period to transmit data to STA2, AP2 may not transmit data due to the set NAV.

That is, in an environment in which a large number of STAs are installed, transmissions and receptions of an RTS frame and a CTS frame cause deterioration in resource utilization efficiency of a WLAN.

Hereinafter, embodiments of the present invention show methods for improving resource utilization efficiency in a WLAN environment where an RTS frame and a CTS frame are transmitted and received.

Figure 6:
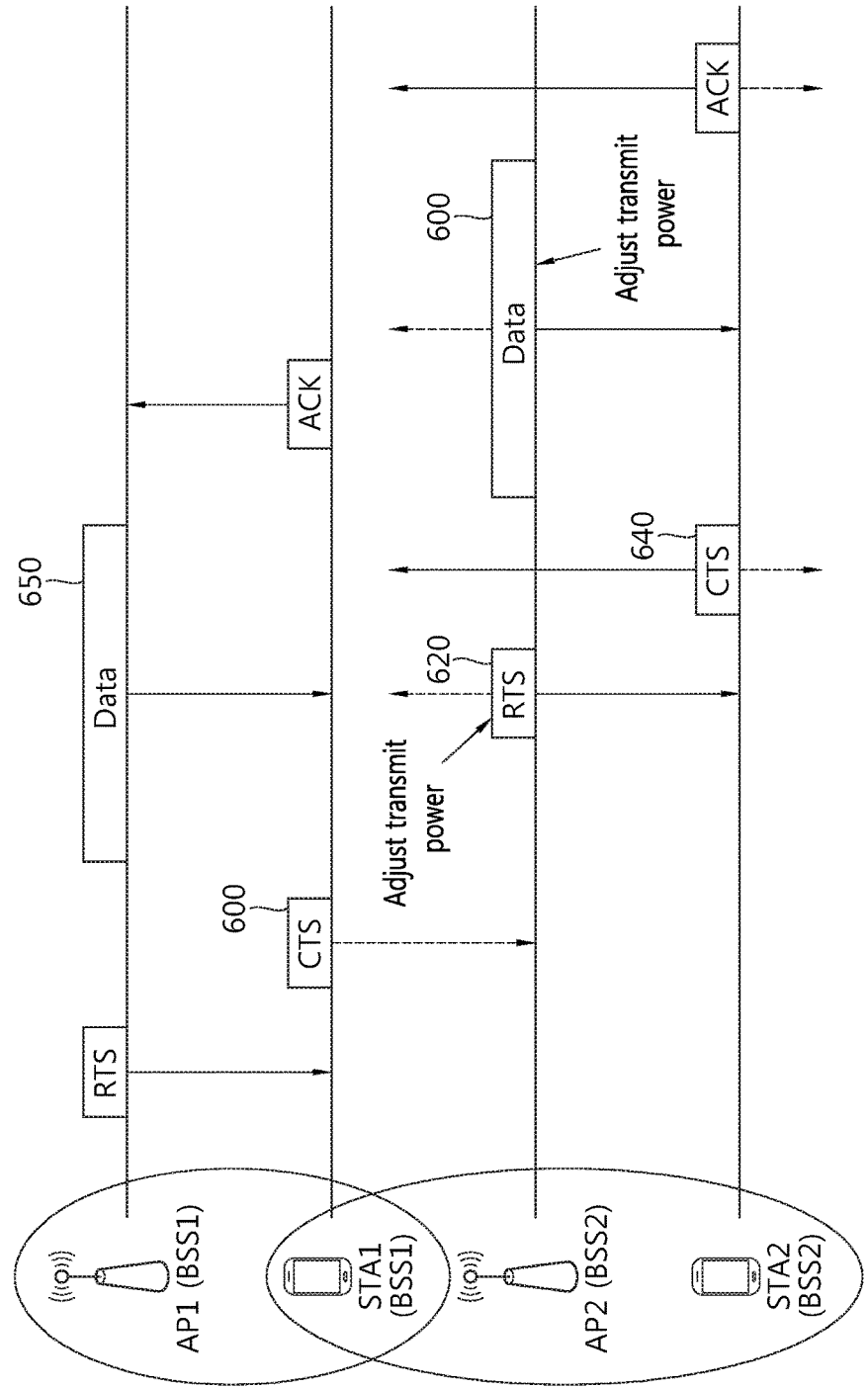
FIG. 6 is a concept view illustrating transmission of a data frame after an NAV is set according to an embodiment of the present invention.

FIG. 6 is a concept view illustrating transmission of a data frame after an NAV is set according to an embodiment of the present invention.

FIG. 6 shows a method of transmitting a frame by adjusting power used for AP2 to transmit a frame and utilizing a portion of an NAV period. Specifically, FIG. 6 shows a procedure that AP2 transmits data (data frame and management frame) 660 to STA2 after AP2 sets an NAV based on a CTS frame 600 transmitted by STA1. The following embodiment of the present invention assumes for convenience of description that data frames 650 and 660 are transmitted between AP1 and STA1 and between AP2 and STA2.

In FIG. 6, it is assumed that STA1 and STA2 are hidden nodes for each other, and AP1 and AP2 are hidden nodes for each other.

Referring to FIG. 6, AP2 may set the NAV based on the CTS frame 600 transmitted from STA1. Specifically, AP2 may receive the CTS frame 600 from STA1. The CTS frame 600 may include a duration field. The duration field of the CTS frame 600 may be used to acquire a transmission opportunity (TXOP) for data transmission and reception between AP1 and STA1 and to set an NAV for a neighboring STA.

The duration field of the CTS frame 600 may include information on a time resource for the data frame 650 and an ACK frame to be transmitted between STA1 and AP1 after transmission of the CTS frame 600. That is, the duration field may be used to set a TXOP of a TXOP holder.

In the following embodiment of the present invention, among RTS frames received by a particular AP (or STA), an RTS frame not targeted at the particular AP (or STA) may be referred to as a non-target RTS frame. Likewise, among CTS frames received by a particular AP (or STA), a CTS frame not targeted at the particular AP (or STA) may be referred to as a non-target CTS frame. Among data frames received by a particular AP (or STA), a data frame not targeted as the particular AP (or STA) may be referred to as a non-target data frame.

That is, AP2 may receive only a non-target CTS frame 600 transmitted by STA1 and set an NAV based on the non-target CTS frame 600.

According to the embodiment of the present invention, when AP2 has data to transmit to STA2 connected to AP2 (pending data to transmit), AP2 may cancel a set NAV and transmit an RTS frame 620 (or transmit an RTS frame even in an NAV period). The RTS frame 620 transmitted by AP2 may be transmitted to STA2 with adjusted low transmit power (or transmit intensity). AP2 transmits the RTS frame 620 with adjusted low transmit power, thereby avoiding a collision between the RTS frame 620 transmitted by AP2 and the data frame 650 transmitted by AP1 based on STA1.

Transmit power of the RTS frame 620 transmitted by AP2 may be determined by various methods. For example, AP2 may determine the transmit power of the RTS frame 620 to transmit based on receive intensity of the non-target CTS frame 600 received from STA1. AP2 may estimate an approximate distance between STA1 and AP2 based on the receive signal intensity of the non-target CTS frame 600. AP2 may determine the transmit power of the RTS frame 620 such that no interference occurs by the RTS frame 620 to be transmitted by AP2 when STA1 receives the data frame 650 from AP1.

AP2 may receive a CTS frame 640 from STA2 in response to the RTS frame 620. Since STA1 and STA2 are hidden nodes for each other, transmit intensity of the CTS frame 640 transmitted by STA2 may not be limited. For example, STA2 may transmit the CTS frame 640 with available full power, thereby causing neighboring STAs to set an NAV.

AP2 may receive the CTS frame 640 from STA2 and transmit the data frame 660 to STA2. When AP2 transmits the data frame 660, transmit power of the data frame 660 transmitted by AP2 may also be adjusted.

By adjusting the transmit power of the data frame 660 transmitted by AP2, a collision between the data frame 650 transmitted by AP1 and the data frame 660 transmitted by AP2 may be prevented. The transmit power of the data frame 660 transmitted by AP2 may have the same intensity as the transmit power of the RTS frame 620 or be adjusted based on the CTS frame 640 received from STA2.

According to the embodiment of the present invention, an RTS frame and a CTS frame may include information on transmit power and/or receive power, and transmit power of a data frame to be transmitted after a procedure of transmitting and receiving the RTS frame and the CTS frame may be adjusted based on the information on transmit power and/or receive power, which will be described in detail.

If AP2 transmits the data frame 660 after AP1 finishes transmitting the data frame 650, AP2 may not perform control of transmit intensity for the data frame 660.

Figure 7:
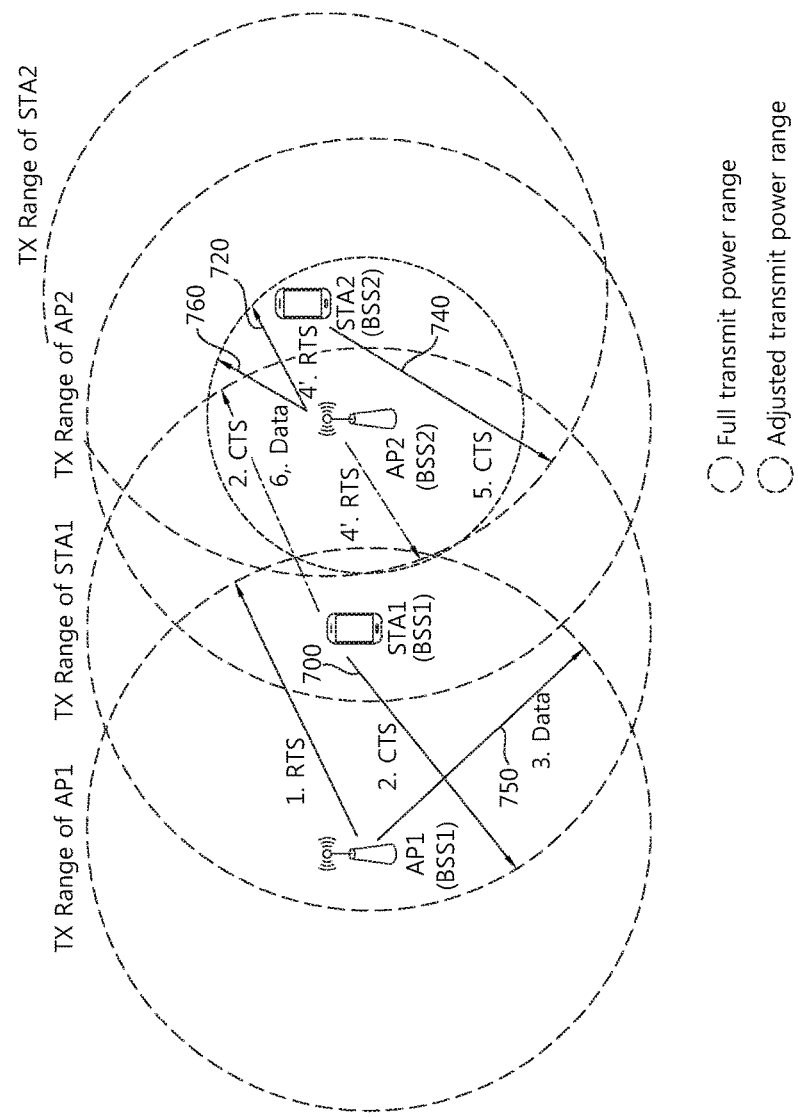
FIG. 7 is a concept view illustrating transmission of a data frame after an NAV is set according to an embodiment of the present invention.

FIG. 7 is a concept view illustrating transmission of a data frame after an NAV is set according to an embodiment of the present invention.

FIG. 7 shows transmission ranges of AP1, STA1, AP2, and STA2 illustrated in FIG. 6. Further, FIG. 7 shows transmissions and receptions of RTS frames, CTS frames, and data frames between AP1 and STA1 and between AP2 and STA2 illustrated in FIG. 6.

Referring to FIG. 7, an RTS frame/CTS frame 700 and a data frame 750 may be transmitted between AP1 and STA1 with full power.

As described above, AP2 may receive only a non-target CTS frame 700 transmitted by STA1. AP2 may set an NAV based on the received non-target CTS frame 700. If AP2 intends to transmit a data frame 760 to STA2, AP2 may cancel the set NAV and transmit an RTS frame 720 to STA 2 (or transmit the RTS frame 720 to STA 2 with the NAV set). Transmit intensity of the RTS frame 720 transmitted by AP2 may be smaller than possible transmit intensity. By adjusting the transmit intensity of the RTS frame 720 transmitted by AP2, a collision between the data frame 750 transmitted to STA1 and the RTS frame 720 transmitted by AP2 may be prevented.

When AP2 receives a CTS frame 740 in response to the RTS frame 720 received from STA2, AP2 may transmit the data frame 760 to STA2. Transmit intensity of the data frame 760 transmitted by AP2 may be the same as the transmit intensity of the RTS frame 720 transmitted by AP2. Alternatively, the transmit intensity of the data frame 760 transmitted by AP2 may be adjusted based on a power related field included in the RTS frame 720 and the CTS frame 740 transmitted and received between AP2 and STA2.

Figure 8:
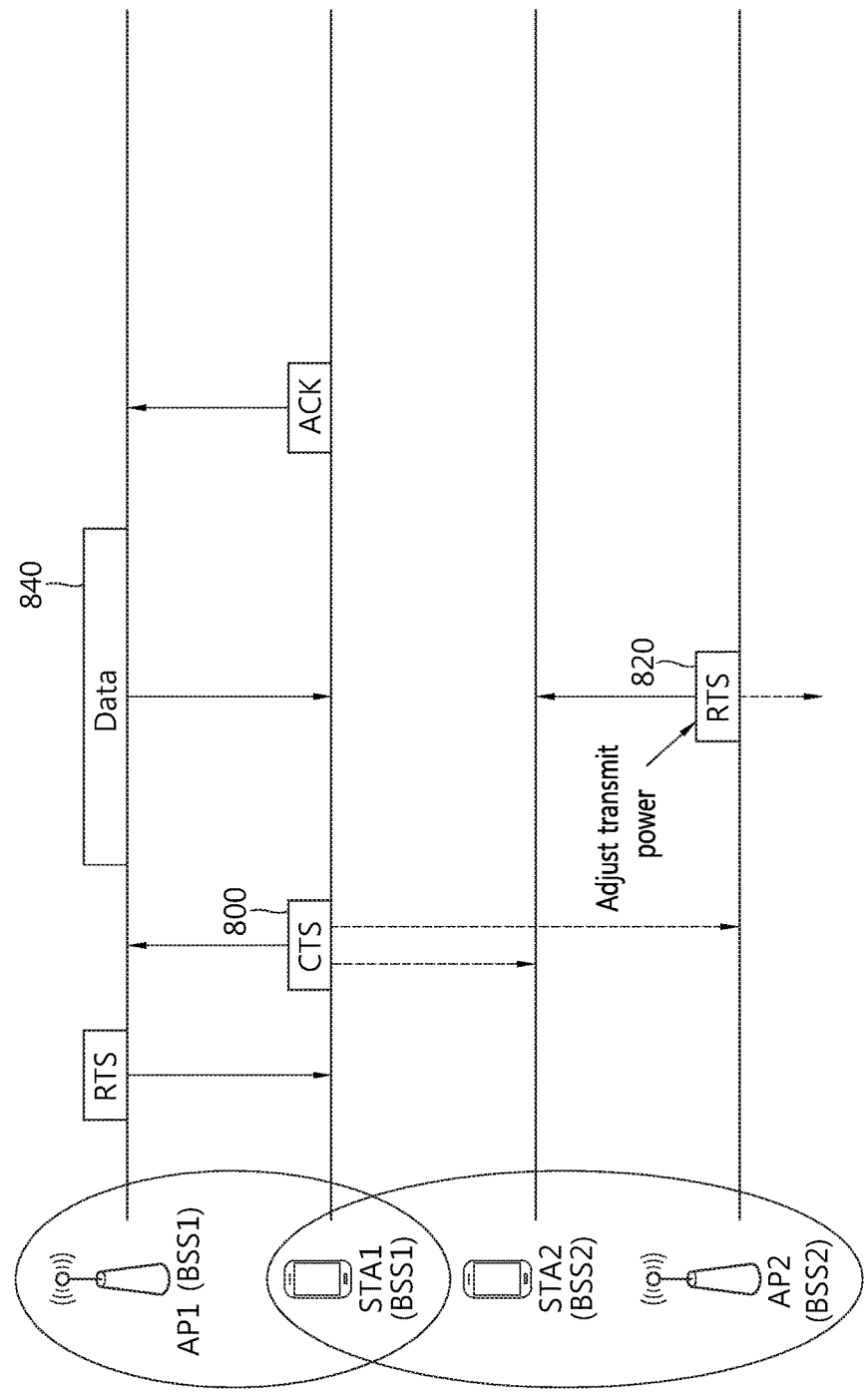
FIG. 8 is a concept view illustrating transmission of a data frame after an NAV is set according to an embodiment of the present invention.

FIG. 8 is a concept view illustrating transmission of a data frame after an NAV is set according to an embodiment of the present invention.

Unlike in FIG. 6 and FIG. 7, FIG. 8 shows operations of AP2 and STA2 when STA1 and STA2 are not hidden nodes for each other.

Referring to FIG. 8, when STA1 and STA2 are not hidden nodes for each other, AP2 and STA2 may receive only a non-target CTS frame 800 transmitted by STA1.

When AP2 has a data frame to transmit to STA2, AP2 may transmit an RTS frame 820 to STA2. As described above, transmit power of the RTS frame 820 transmitted by STA2 may be adjusted, thereby preventing a collision between a data frame 830 transmitted by AP1 and the RTS frame 820 transmitted by STA2.

According to the embodiment of the present invention, when STA2 receives the non-target CTS frame 800, STA2 may not transmit a CTS frame in response to the RTS frame 820 transmitted by AP2. That is, when STA2 receives the non-target CTS frame 800, and receives the RTS frame 820 from AP2 within an NAV period set based on the non-target CTS frame 800, STA2 may transmit no CTS frame. Since there is a possibility of a collision between the CTS frame to be transmitted by STA2 and the data frame 840 transmitted from AP1 to STA1, transmission of the CTS frame by STA2 may be restricted.

Transmission of the CTS frame by STA2 may be restricted not only when an NAV is set upon reception of the non-target CTS frame transmitted by STA1 but also when an NAV is set upon reception of another frame by STA2 from another BSS.

Figure 9:
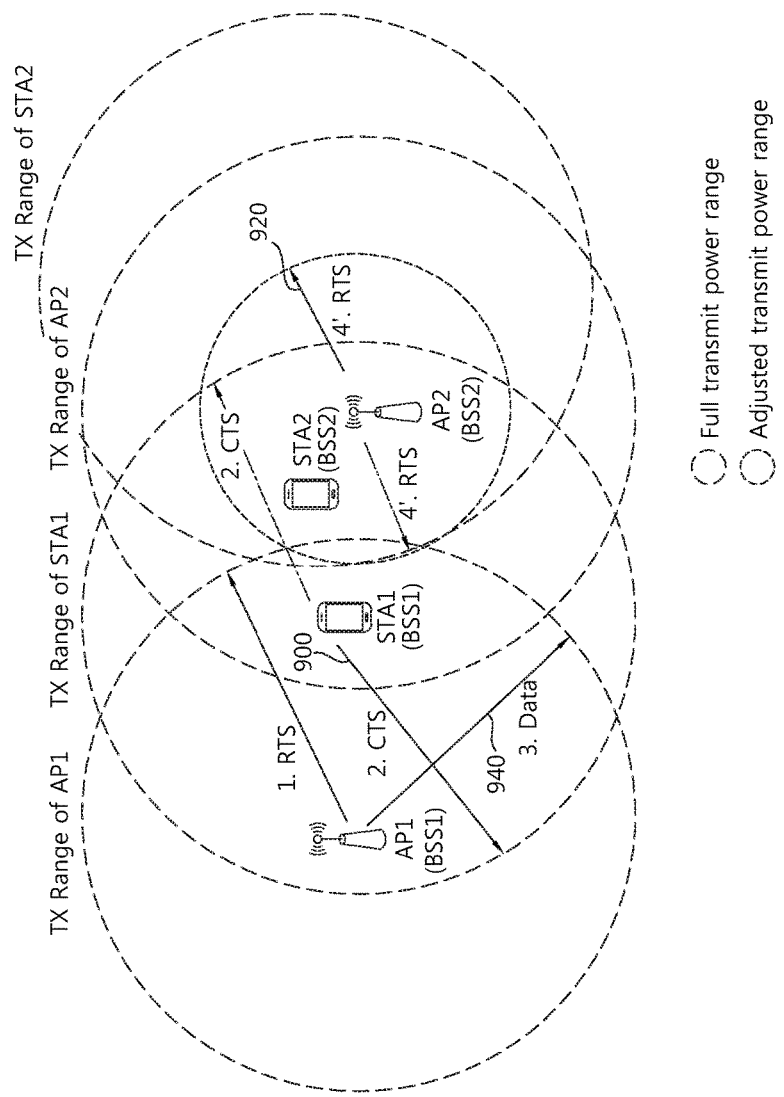
FIG. 9 is a concept view illustrating transmission of a data frame after an NAV is set according to an embodiment of the present invention.

FIG. 9 is a concept view illustrating transmission of a data frame after an NAV is set according to an embodiment of the present invention.

FIG. 9 shows transmission ranges of AP1, STA1, AP2, and STA2 illustrated in FIG. 8. Further, FIG. 8 shows transmissions and receptions of RTS frames, CTS frames, and data frames between AP1 and STA1 and between AP2 and STA2.

Referring to FIG. 9, an RTS frame/CTS frame 900 and a data frame 940 may be transmitted between AP1 and STA1 with full power.

As described above, AP2 and STA2 may receive only the non-target CTS frame 900 transmitted by STA1. AP2 and STA2 may set an NAV based on the received non-target CTS frame 900. If AP2 intends to transmit a data frame to STA2, AP2 may cancel the set NAV and transmit an RTS frame 920 to STA 2 (or transmit the RTS frame 920 to STA 2 with the NAV set). Transmit power of the RTS frame 920 transmitted by AP2 may be adjusted to be smaller than possible transmit power. By adjusting the transmit power of the RTS frame 920 transmitted by AP2, a collision between the data frame 940 transmitted to STA1 and the RTS frame 920 transmitted by AP2 may be prevented.

When STA2 sets the NAV based on the received non-target CTS frame 900, STA2 may not transmit a CTS frame in response to the RTS frame 920 transmitted by AP2. That is, STA2 receives the non-target CTS frame 900, and receives the RTS frame 920 from AP2 within an NAV period set based on the non-target CTS frame 900, STA2 may transmit no CTS frame.

Figure 10:
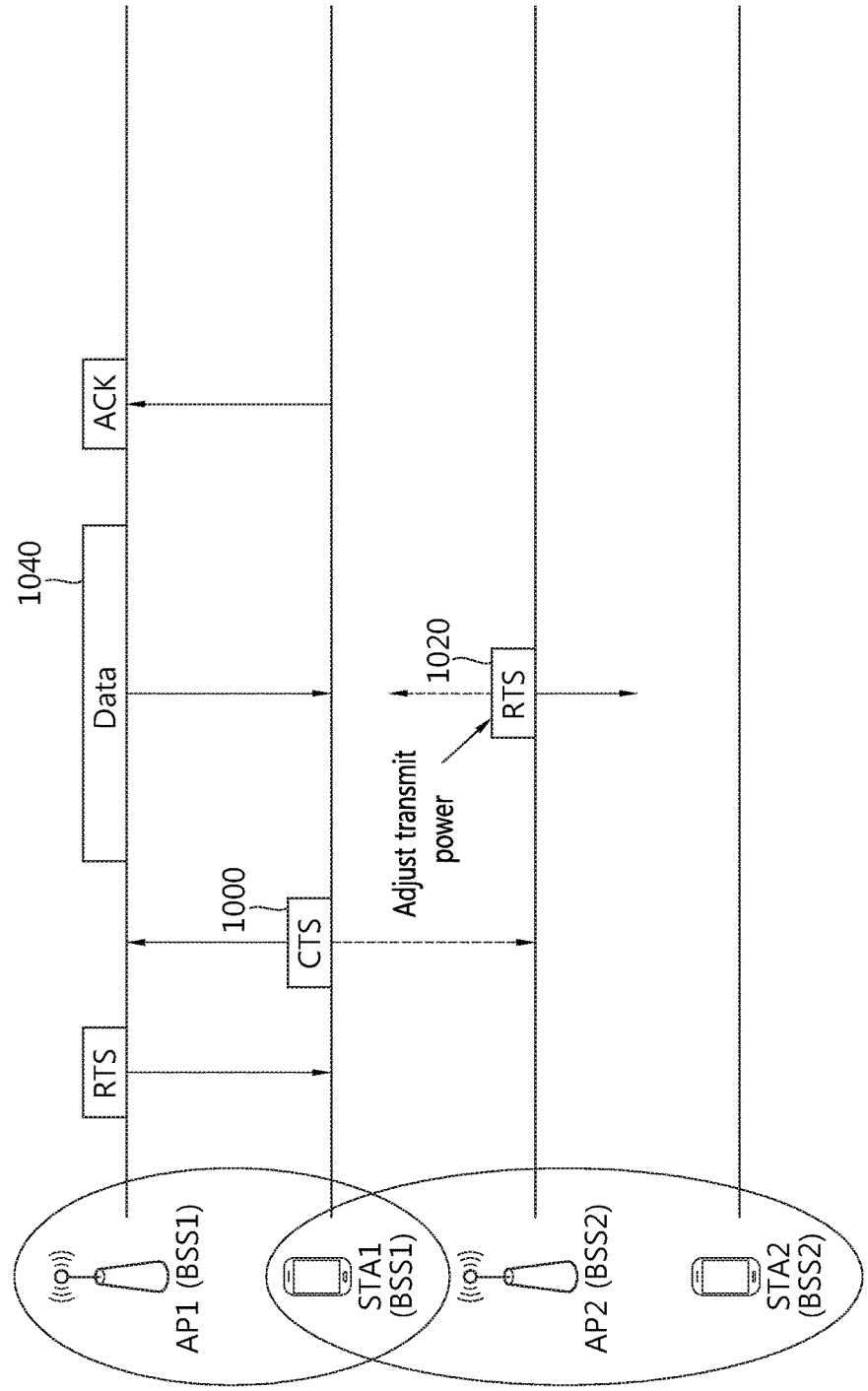
FIGS. 10 and 11 are concept views illustrating transmission of a data frame after an NAV is set according to an embodiment of the present invention.
Figure 11:
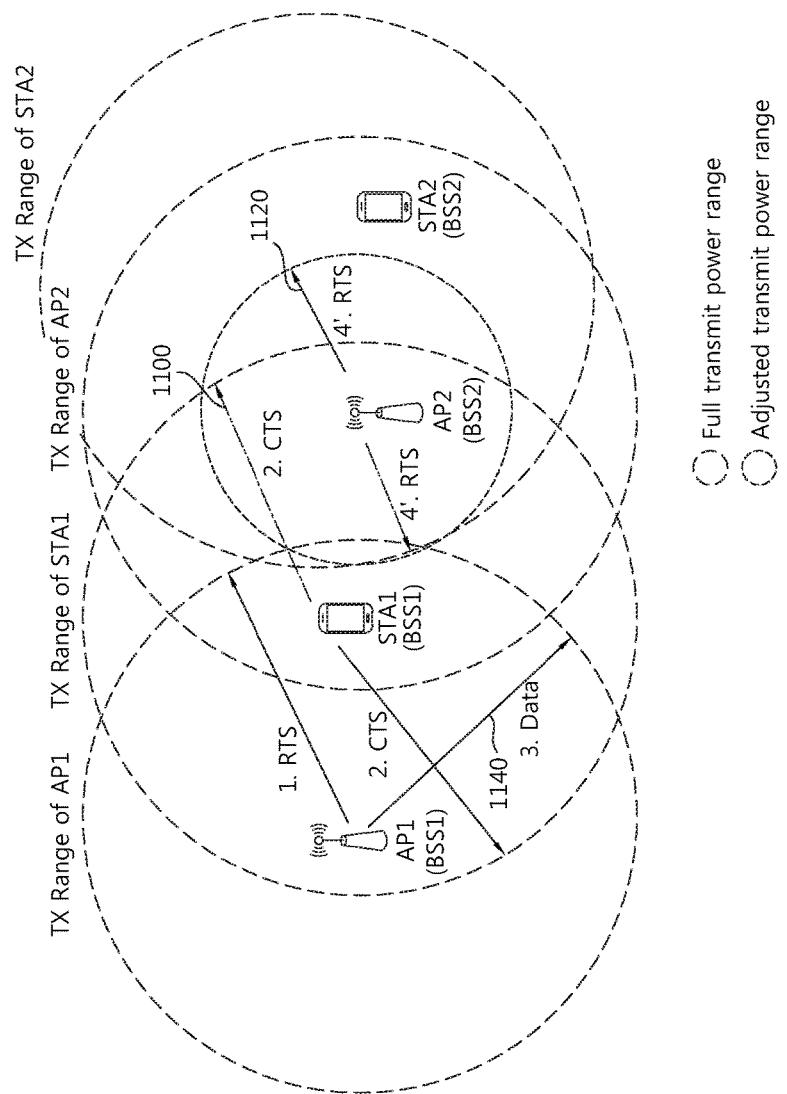

FIGS. 10 and 11 are concept views illustrating transmission of a data frame after an NAV is set according to an embodiment of the present invention.

FIGS. 10 and 11 show that STA2 does not receive an RTS frame due to adjustment of transmit power of the RTS frame transmitted by AP2.

Referring to FIGS. 10 and 11, AP2 may transmit an RTS frame 1020 and 1120 to STA2 with adjusted transmit power.

When transmit power of the RTS frame 1120 is adjusted, STA2 may not receive the RTS frame 1120 transmitted by AP2. When AP2 receives no CTS frame from STA2, STA2 may reset an NAV (when a set NAV is cancelled). That is, setting an NAV by STA2 may be performed again by the time data transmission and reception between AP1 and STA1 is finished (by the time AP1 transmits an ACK frame).

Alternatively, when AP2 receives no CTS frame from STA2, STA2 may maintain an existing NAV set (when the RTS frame 1120 is transmitted even with the NAV set).

According to another embodiment of the present invention, AP2 may retransmit the RTS frame 1020 or immediately transmit a data frame in an NAV period set based on a non-target CTS frame 1100. That is, AP2 may transmit the data frame to STA2 without considering whether the CTS frame is received from STA2.

Figure 12:
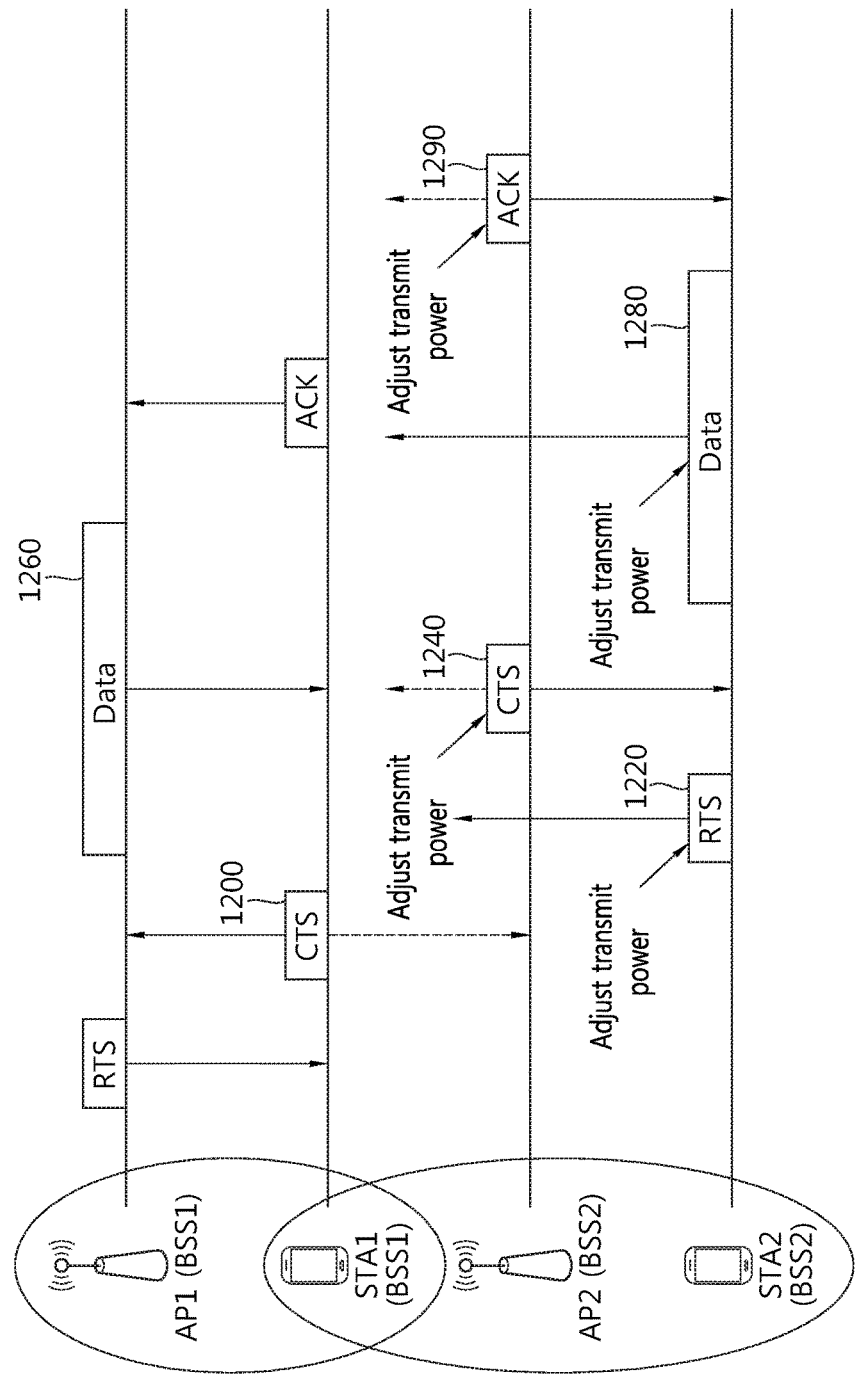
FIG. 12 is a concept view illustrating transmission of a data frame after an NAV is set according to an embodiment of the present invention.

FIG. 12 is a concept view illustrating transmission of a data frame after an NAV is set according to an embodiment of the present invention.

FIG. 12 shows a method in which AP2 transmits a CTS frame 1240 when AP2 receiving only a non-target CTS frame 1200 receives an RTS frame 1220 from STA2 connected to AP2. In FIG. 6, it is assumed that STA1 and STA2 are hidden nodes for each other, and AP1 and AP2 are hidden nodes for each other.

Referring to FIG. 12, AP2 may receive the CTS frame 1200 transmitted by STA1 and set an NAV.

AP2 may receive the RTS frame 1220 from STA2 in an NAV period. The RTS frame 1220 transmitted by STA2 may be transmitted with unrestricted transmit power. For example, the RTS frame 1220 transmitted by STA2 may be transmitted with full power for NAV setting for a neighboring STA.

When AP2 receives the RTS frame 1220, AP2 may transmit a CTS frame 1240 to STA2. If AP2 transmits the CTS frame 1240 with full power, a collision may occur between a data frame 1260 transmitted by AP1 to STA1 and the CTS frame 1240 transmitted by AP2.

Thus, according to the embodiment of the present invention, transmit power of the CTS frame 1240 transmitted by AP2 may be adjusted. The transmit power of the CTS frame 1240 may be determined by various methods. For example, AP2 may determine transmit intensity of the CTS frame 1240 based on receive intensity of the non-target CTS frame 1200 received from STA1. AP2 may estimate an approximate distance between STA1 and AP2 based on the receive signal intensity of the non-target CTS frame 1200. AP2 may determine the transmit power of the CTS frame 1240 such that no interference occurs by the CTS frame 1240 to be transmitted by AP2 when STA1 receives the data frame 1260 from AP1.

AP2 may receive a data frame 1280 from STA2 after transmitting the CTS frame 1240. AP2 may receive the data frame 1280 from STA2 and then transmit an ACK frame 1290 to STA2 in response to the data frame 1280. The ACK frame 1290 transmitted by AP2 may also be a frame with adjusted transmit power, like the CTS frame. For example, when the ACK frame 1290 is transmitted by AP2 within a transmission period of the data frame 1260 transmitted by AP1, transmit power of the ACK frame 1290 transmitted by AP2 may also be adjusted.

By using this method, AP2 may receive the data frame 1280 from STA2 within the NAV set based on the non-target CTS frame 1200.

Figure 13:
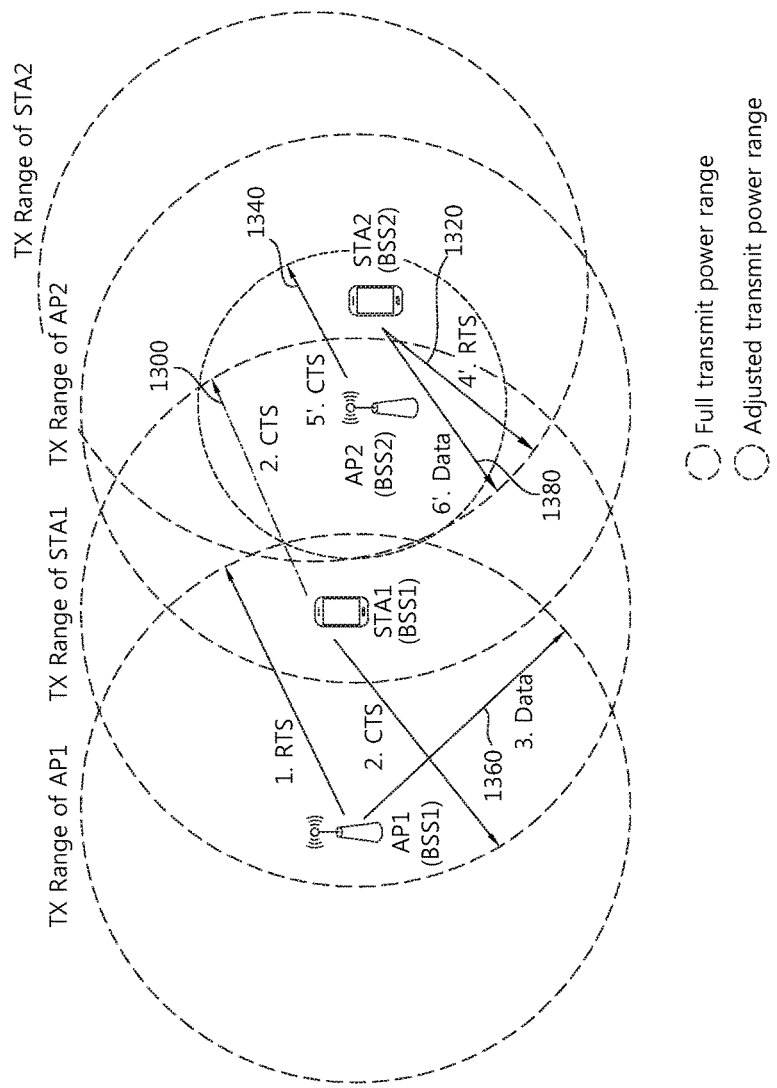
FIG. 13 is a concept view illustrating transmission of a data frame after an NAV is set according to an embodiment of the present invention.

FIG. 13 is a concept view illustrating transmission of a data frame after an NAV is set according to an embodiment of the present invention.

FIG. 13 shows transmission ranges of AP1, STA1, AP2, and STA2 illustrated in FIG. 12. Further, FIG. 13 shows transmissions and receptions of RTS frames, CTS frames, and data frames between AP1 and STA1 and between AP2 and STA2.

Referring to FIG. 13, an RTS frame/CTS frame 1300 and a data frame 1360 may be transmitted between AP1 and STA1 with full power.

As described above, AP2 may receive only a non-target CTS frame 1300 transmitted by STA1. AP2 may set an NAV based on the non-target CTS frame 1300. If AP2 receives an RTS frame 1320 from STA2 within an NAV period, AP2 may cancel the set NAV and transmit a CTS frame 1340 to STA 2 (or transmit the CTS frame 1340 to STA 2 with the NAV set). Transmit power of the CTS frame 1340 transmitted by AP2 may be smaller than possible transmit power. By adjusting the transmit power of the CTS frame 1340 transmitted by AP2, a collision between the data frame 1360 transmitted by AP1 to STA1 and the CTS frame 1340 transmitted by AP2 may be prevented.

STA2 may receive the CTS frame 1340 from AP2 and transmit a data frame 1380 to AP2. AP2 may transmit an ACK frame to STA 2 in response to the data frame 1380 received from STA2. As described above, transmit power of the ACK frame to be transmitted by AP2 may also be adjusted.

Figure 14:
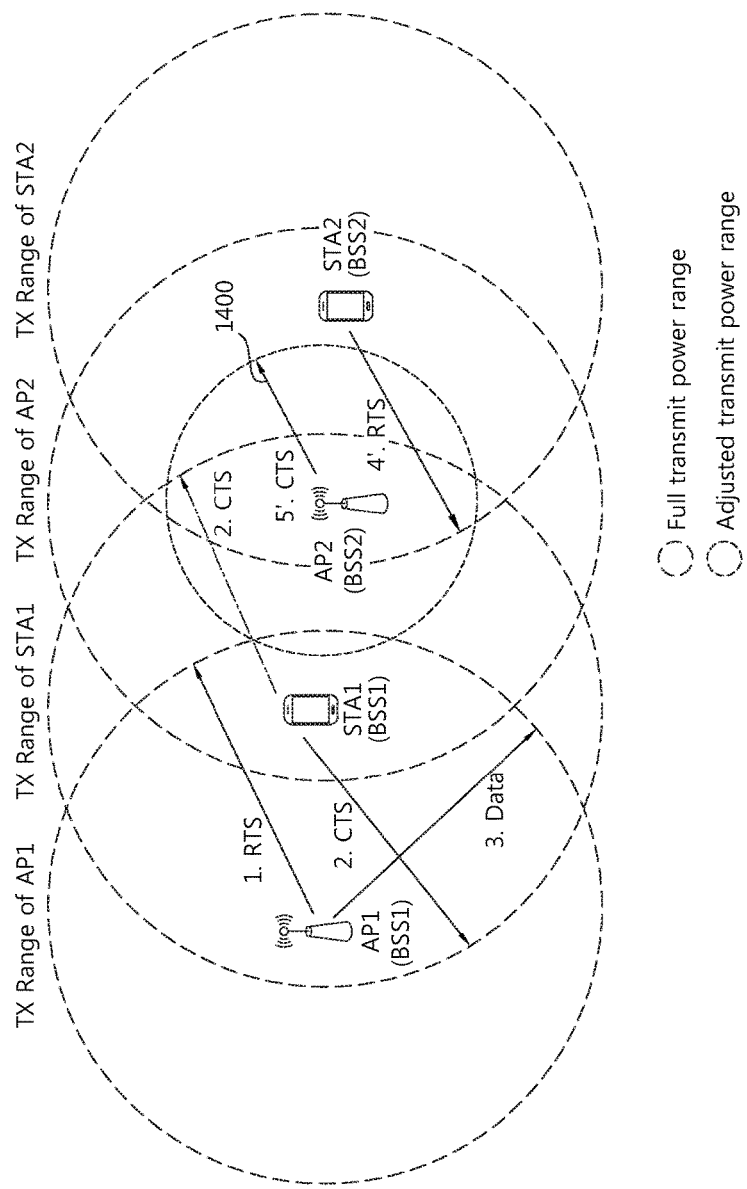
FIG. 14 is a concept view illustrating transmission of a data frame after an NAV is set according to an embodiment of the present invention.

FIG. 14 is a concept view illustrating transmission of a data frame after an NAV is set according to an embodiment of the present invention.

FIG. 14 shows that STA2 does not receive a CTS frame due to adjustment of transmit power of the CTS frame transmitted by AP2.

Referring to FIG. 14, AP2 may transmit a CTS frame 1400 to STA2 with adjusted transmit power.

STA2 may not receive the CTS frame 1400 transmitted by AP2 due to adjustment of the transmit power of the CTS frame. In this case, AP2 may reset an NAV (when a set NAV is cancelled). AP2 may reset an NAV when reception timing of a data frame passes after the CTS frame 1400 is transmitted. Setting an NAV by AP2 may be performed by the time data transmission and reception between AP1 and STA1 is finished (by the time AP1 transmits an ACK frame). Alternatively, when AP2 transmits the CTS frame 1400 even with the NAV set, the existing NAV set may be maintained.

Figure 15:
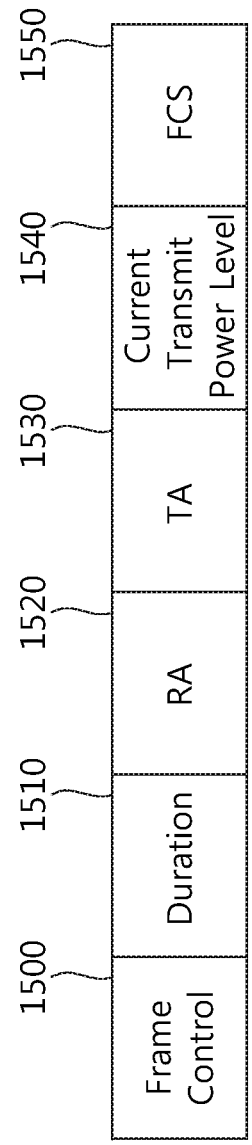
FIG. 15 is a concept view illustrating an RTS frame according to an embodiment of the present invention.

FIG. 15 is a concept view illustrating an RTS frame according to an embodiment of the present invention.

Referring to FIG. 15, the RTS frame may include a Frame Control field 1500, a Duration field 1510, a Receiver Address (RA) field 1520, a Transmitter Address (TA) field 1530, a Current Transmit Power Level field 1540, and a Frame Check Sequence (FCS) 1550.

The Frame Control field 1500 may include information on a frame type and a subframe type to indicate what kind of frame a transmitted frame is.

The Duration field 1510 may include information on a time resource needed for an RTS/CTS procedure and for subsequent data transmission and reception. For example, the Duration field 1510 may include information on a time resource for transmissions and receptions of the RTS frame, a CTS frame, pending data or a management frame and for Short Interframe Space (SIFS) between frames.

The RA field 1520 may include an address of an STA to receive the RTS frame. The RA field 1520 may include address information on an STA to receive a data frame, a management frame or a control frame directed to an individual address after transmission of the RTS frame.

The TA field 1530 may include an address of an STA to transmit the RTS frame.

The Current Transmit Power Level field 1540 may include information on a transmit power level of the STA to transmit the RTS frame.

The FCS 1550 may include information for validation of a received frame.

According to the embodiment of the present invention, the Current Transmit Power Level field 1540 included in the RTS frame may be referenced by a receiving side of the RTS frame. For example, the receiving side of the RTS frame may compare the information on the transmit power level included in the Current Transmit Power Level field 1540 of the RTS frame with receive power of the received RTS frame to estimate a position of a transmitting side of the RTS frame.

For example, referring back to FIG. 6, AP2 may transmit an RTS frame with adjusted power to STA2. A Current Transmit Power Level field 1540 of the RTS frame transmitted by AP2 may include information on the adjusted power. STA2 may make a request for readjustment of transmit power to AP2 through a CTS frame based on the information on the adjusted power included in the RTS frame.

Although FIGS. 6 to 15 illustrate the embodiments in which an AP receives a non-target CTS frame from an STA, an STA may receive a non-target CTS frame from another STA and perform the foregoing operations with an AP connected to the STA.

Figure 16:
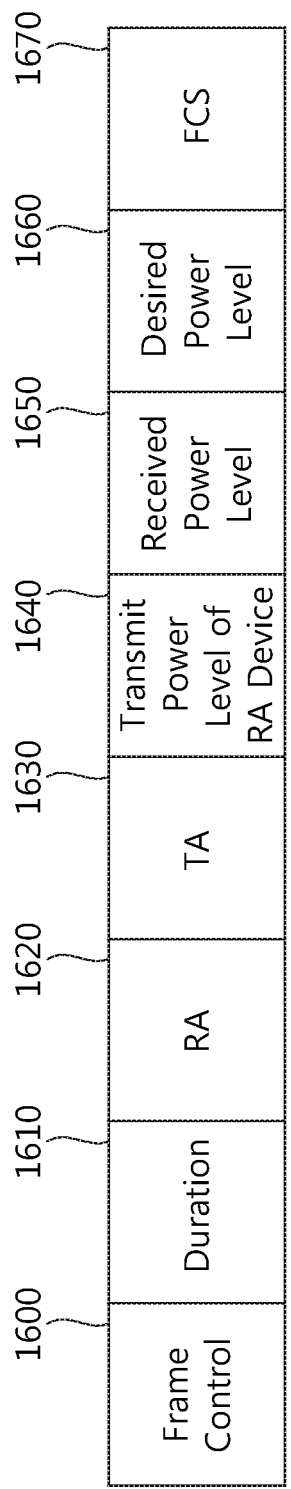
FIG. 16 is a concept view illustrating a CTS frame according to an embodiment of the present invention.

FIG. 16 is a concept view illustrating a CTS frame according to an embodiment of the present invention.

Referring to FIG. 16, the CTS frame may include a Frame Control field 1600, a Duration field 1610, an RA field 1620, a TA field 1630, a Transmit Power Level of RA Device field 1640, a Received Power Level field 1650, a Desired Power Level field 1660, and an FCS 1670.

The Frame Control field 1600 may include information on a frame type and a subframe type to indicate what kind of frame a transmitted frame is.

The Duration field 1610 may include information on a time resource needed for an RTS/CTS procedure and for subsequent data transmission and reception. The Duration field 1610 may include information on a time resource for transmissions and receptions of the CTS frame, pending data or a management frame and for Short Interframe Space (SIFS) between frames.

The RA field 1620 may include an address of an STA to receive the CTS frame.

The TA field 1630 may include an address of an STA to transmit the CTS frame.

The Transmit Power Level of RA Device field 1640 may include information on a transmit power level of a transmitting end to transmit an RTS frame. The Transmit Power Level of RA Device field 1640 may include the same value as the Current Transmit Power Level field of the RTS frame.

The Received Power Level field 1650 may include information on receive power of the RTS frame.

The Desired Power Level field 1650 may include information on transmit power requested when the transmitting end of the RTS frame transmits a subsequent frame.

The FCS 1670 may include information for validation of a received frame.

Referring back to FIG. 6, AP2 may transmit an RTS frame 620 with adjusted power to STA2. A Current Transmit Power Level field of the RTS frame 620 transmitted by AP2 may include information on the adjusted power.

STA2 may make a request for readjustment of transmit power to AP2 through a CTS frame 640 based on the information on the adjusted power included in the RTS frame 620. The CTS frame 640 transmitted by STA2 may request adjustment of transmit power of a data frame to be subsequently transmitted by AP2 through a Desired Power Level field. AP2 may transmit the data frame 660 considering the Desired Power Level field as long as a collision with a data frame transmitted by AP1 does not occur.

According to another embodiment of the present invention, AP2 may receive a CTS frame 600 transmitted by STA1, transmit an RTS frame 620 based on a Transmit Power Level of RA Device field 1640 and a Received Power Level field 1650 included in the CTS frame 600, and estimate an approximate position of AP1 to transmit a data frame 650. Also, AP2 may estimate transmit power of the data frame 650 to be subsequently transmitted by AP1 based on a Desired Power Level field 1650 included in the CTS frame 600.

Figure 17:
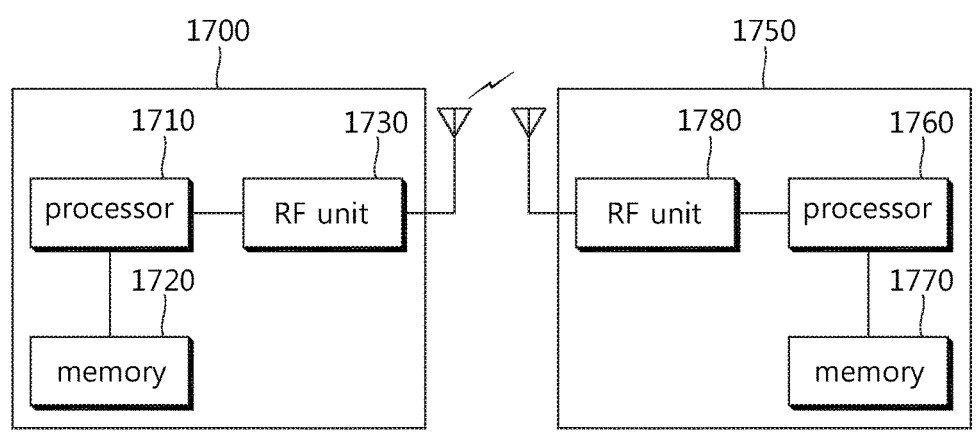
FIG. 17 is a block diagram illustrating a wireless device according to an embodiment of the present invention.

FIG. 17 is a block diagram illustrating a wireless device according to an embodiment of the present invention.

Referring to FIG. 17, the wireless device 1700 may be an STA to implement the foregoing embodiments, which may be an AP 1700 or a non-AP STA (or STA) 1750.

The AP 1700 includes a processor 1710, a memory 1720, and a radio frequency (RF) unit 1730.

The RF unit 1730 may be connected to the processor 1710 to transmit/receive a radio signal.

The processor 1710 may implement functions, processes and/or methods suggested in the present invention. For example, the processor 1710 may be configured to perform operations of a wireless device according to the foregoing embodiments of the present invention. The processor may perform operations of a wireless device illustrated in the embodiments of FIGS. 6 to 13.

For example, the processor 1710 may be configured to receive a non-target RTS frame from another STA, not to receive a non-target CTS frame after a certain period of time, and to transmit an RTS frame to the STA when intending to transmit a data frame to the STA. Further, when receiving a CTS frame from the STA in response to the RTS frame, the processor 1710 may be configured to transmit a data frame to the STA.

Here, the non-target RTS frame may include an RA field indicating a third STA, and the non-target CTS frame may be a response frame to the non-target RTS frame. A first duration value included in the RTS frame to determine transmission duration of a data frame may be determined based on a second duration value included in the non-target RTS frame.

Alternatively, the processor 1710 may receive a non-target RTS frame from another STA, not receiving a non-target CTS frame after a certain period of time. When the RTS frame is received, the processor 1710 may transmit a CTS frame to the STA in response to the RTS frame and receive a data frame from the STA. A first duration value included in the CTS frame to determine transmission duration of a data frame may be determined based on a second duration value included in the non-target RTS frame.

The STA 1750 includes a processor 1760, a memory 1770, and an RF unit 1780.

The RF unit 1780 may be connected to the processor 1760 to transmit/receive a radio signal.

The processor 1760 may implement functions, processes and/or methods suggested in the present invention. For example, the processor 1720 may be configured to perform operations of a wireless device according to the foregoing embodiments of the present invention. The processor may perform operations of a wireless device illustrated in the embodiments of FIGS. 6 to 13.

For example, the processor 1760 may be configured to receive a non-target RTS frame from another STA, not to receive a non-target CTS frame after a certain period of time, and to transmit an RTS frame to an AP when intending to transmit a data frame to the AP. Further, when receiving a CTS frame from the AP in response to the RTS frame, the processor 1760 may be configured to transmit a data frame to the AP.

Here, the non-target RTS frame may include an RA field indicating a third STA, and the non-target CTS frame may be a response frame to the non-target RTS frame. A first duration value included in the RTS frame to determine transmission duration of a data frame may be determined based on a second duration value included in the non-target RTS frame.

The processors 1710 and 1760 may include an application-specific integrated circuit (ASIC), other chipsets, a logic circuit, a data processor and/or a converter to convert a baseband signal and a radio signal from one to the other. The memories 1720 and 1770 may include a read-only memory (ROM), a random access memory (RAM), a flash memory, a memory card, a storage medium and/or other storage devices. The RF units 1730 and 1780 may include at least one antenna to transmit and/or receive a radio signal.

When the embodiments are implemented with software, the foregoing techniques may be implemented by a module (process, function, or the like) for performing the foregoing functions. The module may be stored in the memories 1720 and 1770 and be executed by the processors 1710 and 1760. The memories 1720 and 1570 may be disposed inside or outside the processors 1710 and 1760 or be connected to the processors 1710 and 1760 via various well-known means.

What is claimed is:

1. A method for transmitting data in a wireless local area network (WLAN) comprising:
    receiving, by a first station (STA) which is associated with at least two different STAs including a second STA and a third STA, a first Clear to Send (CTS) frame from the second STA, wherein the first CTS frame does not indicate the first STA;
    setting, by the first STA, a network allocation vector (NAV) period based on the first CTS frame;

determining, by the first STA, whether the first STA has pending downlink data for the third STA during the NAV period;

if the first STA has pending downlink data for the third STA during the NAV period, transmitting, by the first STA, a first Request to Send (RTS) frame to the third STA within the NAV period, wherein transmission power of the first RTS frame is determined based on the first CTS frame;

determining, by the first STA, whether a second RTS frame is received from the third STA during the NAV period, wherein the second RTS frame indicates the first STA; and if the second RTS frame is received from the third STA during the NAV period, transmitting, by the first STA, a second CTS frame to the third STA during the NAV period, wherein transmission power of the second CTS frame is determined based on the first CTS frame.

2. The method of claim 1, wherein the first RTS frame comprises a Current Transmit Power Level field, and the Current Transmit Power Level field comprises information on the transmission power of the first RTS frame.

3. A first station (STA) transmitting data in a wireless local area network (WLAN), the first STA comprising:

a radio frequency (RF) unit configured to transmit a radio signal to at least two different associated STAs including a second STA and a third STA; and a processor operatively connected to the RF unit, wherein the processor is configured to:

receive a first Clear to Send (CTS) frame from the second STA, wherein the first CTS frame does not indicate the first STA;

set a network allocation vector (NAV) period based on the first CTS frame;

determine whether the first STA has pending downlink data for the third STA during the NAV period;

if the first STA has pending downlink data for the third STA during the NAV period, transmit a first Request to Send (RTS) frame to the third STA within the NAV period, wherein transmission power of the first RTS frame is determined based on the first CTS frame;

determine whether a second RTS frame is received from the third STA during the NAV period, wherein the second RTS frame indicates the first STA; and if the second RTS frame is received from the third STA during the NAV period, transmit a second CTS frame to the third STA during the NAV period, wherein transmission power of the second CTS frame is determined based on the first CTS frame.

4. The first STA of claim 3, wherein the first RTS frame comprises a Current Transmit Power Level field, and the Current Transmit Power Level field comprises information on the transmission power of the first RTS frame.

* * * * *